United States Patent [19]

Smith

[11] 4,287,428
[45] Sep. 1, 1981

[54] AUTOMATIC SPRING POWERED BATTERY CHARGING DEVICE

[76] Inventor: James Smith, 2503 Prospect, Kansas City, Mo. 64127

[21] Appl. No.: 61,274

[22] Filed: Jul. 27, 1979

[51] Int. Cl.$^3$ .............................................. H02J 7/00
[52] U.S. Cl. ...................................... 290/1 E; 185/11; 185/40 B; 320/61; 322/38
[58] Field of Search ................. 290/11, 4, 50; 320/61; 322/38, 40–43; 185/40, 43, 10, 11

[56] References Cited

U.S. PATENT DOCUMENTS

| | | |
|---|---|---|
| 778,133 | 12/1904 | Keates . |
| 1,520,918 | 12/1924 | Hurlbut . |
| 1,920,479 | 8/1933 | Poole . |
| 3,861,487 | 1/1975 | Gill . |
| 4,131,842 | 12/1978 | Smith . |

FOREIGN PATENT DOCUMENTS 2353714  5/1975  Fed. Rep. of Germany .
 450224 10/1934  United Kingdom .
 514351  1/1938  United Kingdom .

Primary Examiner—J. D. Miller
Assistant Examiner—John W. Redman
Attorney, Agent, or Firm—Lowe, Kokjer, Kircher, Wharton & Bowman

[57] ABSTRACT

A battery charging device which is driven by a torsional spring. A gear train driven by the spring is coupled with a wheel having peripheral teeth. A control lever is reciprocated pivotally by a small spring to engage the teeth of the wheel in a manner to control its rotation. The wheel in turn applies impulses which help to keep the lever in motion. The gear train is also coupled with an alternator such that the intermittent movement of the gear train is used to drive the alternator. The electrical current produced by the alternator is used to recharge a battery. An electric motor operates in combination with the switch mechanism to automatically wind up the torsional spring when it has been unwound below a preselected tension level.

6 Claims, 3 Drawing Figures

AUTOMATIC SPRING POWERED BATTERY CHARGING DEVICE

BACKGROUND AND BRIEF DESCRIPTION OF THE INVENTION

This invention relates generally to the charging of batteries and deals more particularly with an improved battery charging device.

The ever growing demand for electrical power and the growing cost of generating this power have created a need to develop new energy storage techniques and devices. It is particularly important to control the power consumption of kitchen appliances which utilize electric motors because of their widespread use. The present invention is directed to an improved battery charging device which finds utility in a large number of applications. In particular, this battery charging device is well suited to be incorporated into electrical appliances to power their motors.

It is therefore an important object of the present invention to provide a highly efficient battery charging device which may be incorporated into electrical appliances to power the electrical motors thereof.

An additional object of the present invention is to provide a highly efficient battery charging device of the character described which acts to charge a battery while minimizing energy losses.

A further object of the present invention is to provide a battery charging device of the character described which is accurately controlled as to its speed and manner of operation.

An additional object of the present invention is to provide, in a battery charging device of the character described, a drive spring which has its tension automatically maintained within a predetermined range.

Another object of the present invention is to provide a battery charging device of the character described in which a portion of the output power is used to maintain the tension of the drive spring.

It is an additional object of the present invention to provide a battery charging device of the character described which is simple and economical to construct and reliable in operation.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views.

Figure 1:
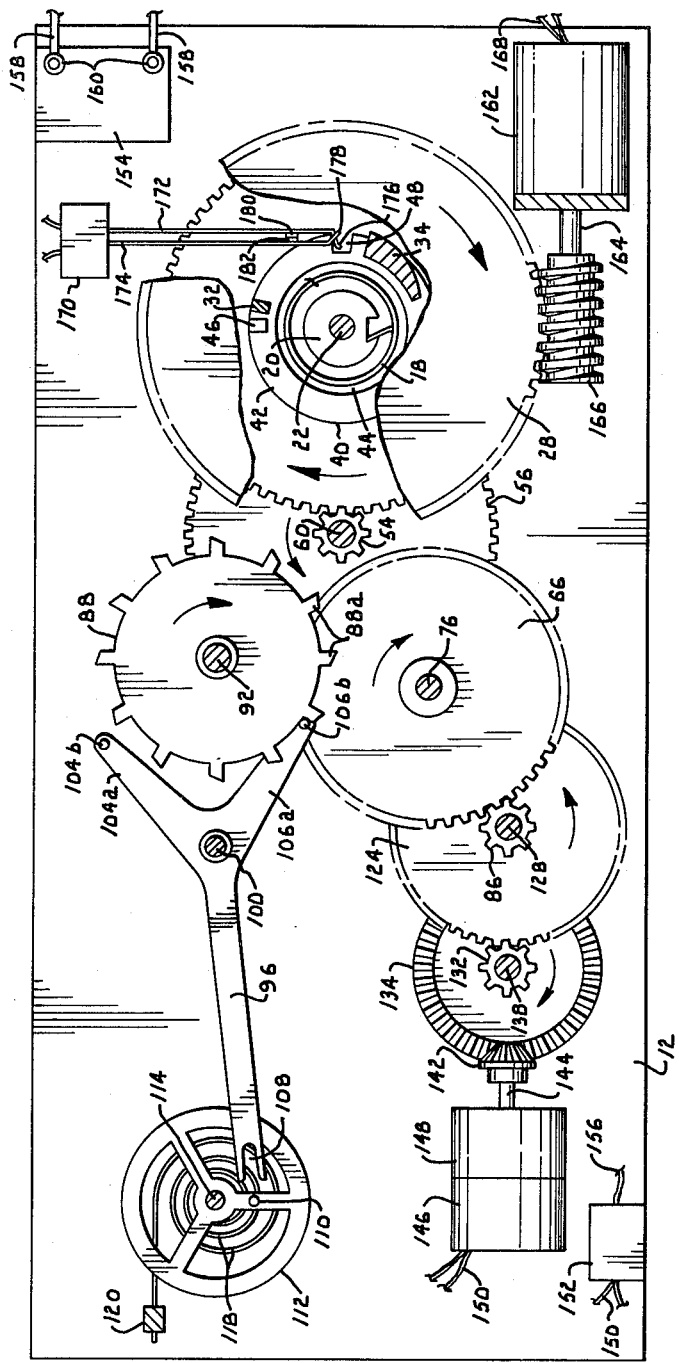
FIG. 1 is a top plan view of a battery charging device constructed according to a preferred embodiment of the present invention, with the upper frame plate removed and portions broken away for illustrative purposes.
Figure 2:
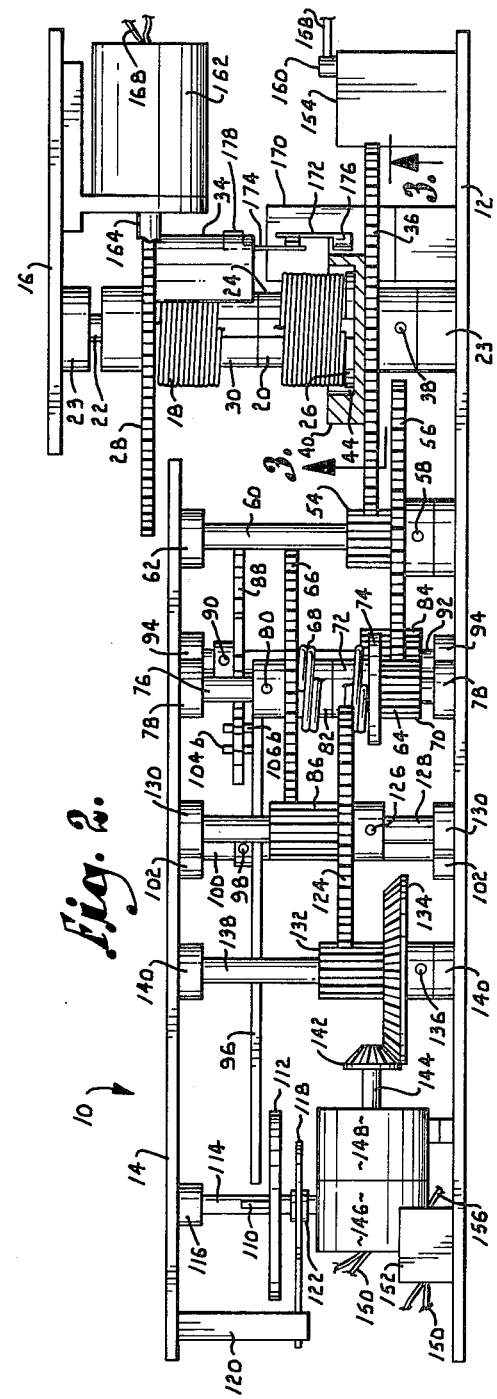
FIG. 2 is side plan view of the battery charging device shown in FIG. 1.

Referring now to FIGS. 1 & 2, reference numeral 10 generally designates the battery charging device of the present invention. The frame of the device includes a flat base plate 12, a flat top plate 14, and a flat motor support plate 16. Top plate 14 is located above and parallel to plate 12 while motor support plate 16 is carried above plate 14 in a parallel relationship therewith. The frame plates 12, 14 and 16 may be mounted within a battery powered device such as an electrical appliance (not shown herein).

The battery charging device 10 is driven by a torsional drive spring 18. The lower end of drive spring 18 is connected with a drive collar 20 which is pinned or otherwise fixedly attached to a vertical shaft 22. Shaft 22 is in turn supported for rotation by a pair of bearings 23 which are mounted to frame plates 12 and 16. Drive collar 20 is constructed to have a cylindrically shaped body portion 24 and a disc-shaped bottom portion 26 which projects outward from the body portion of the collar. The upper end of drive spring 18 is in turn connected with an upper gear wheel 28 which is carried by shaft 22 such that the gear is free to move independently of the shaft. A cylindrically shaped block 30 is fixedly attached to the under surface of gear 28 at the axial center thereof. In addition, a movement imparting arm 32 (FIG. 1) and a camming arm 34 are attached to the under side of gear 28 to project outward therefrom. As shown best in FIG. 2, gear 28 and drive collar 20 are positioned on shaft 22 in an axially adjacent relationship such that the bottom surface of block 30 abuts against the upper surface of the body portion 24 of drive collar 20. Drive spring 18 is in turn wound around the body portion 24 of drive collar 20 and around block 30 in a spiral configuration.

A gear wheel 36 is mounted on shaft 22 below drive collar 20. Gear 36 is pinned at 38 to shaft 22 so that the gear moves in unison with the shaft. A actuator ring 40 is sandwiched between drive collar 20 and gear 36 such that the hollow inner portion of the ring encircles shaft 22. Actuator ring 40 is constructed to have a circular outer peripheral edge 42 and a cylindrically-shaped cavity 44 in the upper surface thereof. A movement receiving arm 46 extends upward from the upper surface of actuator ring 40 at a right angle therewith. In addition, the outer peripheral edge of the actuator ring 40 has a notch 48 cut therein as shown in FIG. 1.

Figure 3:
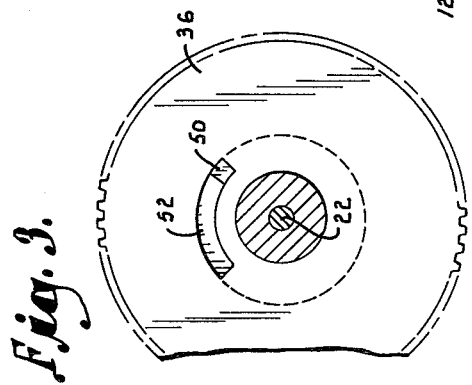
FIG. 3 is a sectional view on an enlarged scale taken generally along line 3—3 of FIG. 2.

Referring now to FIG. 3, actuator ring 40 is coupled with gear 36 in such a manner as to restrict rotary movement of the actuator ring relative to gear 36. In particular, actuator ring 40 has a locking pin 50 attached to its underside. Locking pin 50 projects outward from the underside of the actuator ring and rides within an arcuate slot 52 which is provided in gear 36.

Gear 36 mates with and drives a small pinion 54 which is rigidly secured with a larger gear 56. Gear 56 is pinned at 58 to a vertical shaft 60 which is mounted to frame plates 12 and 14 by means of bearings 62.

Gear 56 simultaneously drives a pair of pinions 64 and 84. Pinion 84 is rigidly secured with a wheel 88 which is arranged to have relatively widely spaced teeth 88a on its periphery (FIG. 1). Pinion 84 and gear 88 are connected at 90 to a shaft 92 which is rotatably supported by bearings 94 mounted to frame plates 12 and 14.

The rotation of wheel 88 is controlled by a lever 96 which is connected at 98 to a vertical shaft 100. Shaft 100 is supported by bearings 102 such that lever 96 is free to pivot about the axis provided by the shaft. Lever 96 is in the general shape of a "Y" and has at one end thereof a pair of diverging legs which are designated by the numerals 104a and 106a. Legs 104a and 106a respectively carry pins 104b and 106b at their ends. Pins 104b and 106b interact with the teeth 88a of wheel 88 in a manner that will be explained in greater detail below.

The end of lever 96 opposite the legs is forked in a manner to present a notch 108. Notch 108 receives a small vertical pin 110 which is carried on wheel 112 mounted on a vertical shaft 114. Vertical shaft 114 is supported for rotation by bearings 116 which are mounted to plates 12 and 14. It is noted that pin 110 is offset from shaft 114.

Wheel 112 pivots in reciprocating fashion under the influence of a small coil spring 118. The outer end of spring 118 is connected to a stationary post 120 which is mounted to plate 14. The inner end of the spring is connected with a collar 122 which is mounted on shaft 114. Spring 118 acts to pivot shaft 114 and wheel 112 back and forth as the spring is disabled from its stable position in a manner to place it alternately under tension and compression.

Pinion 64 wich is also driven by gear 56 is in turn coupled with a gear 66 by means of a torsional spring 68. Pinion 64 is comprised of a lower portion 70 having a plurality of gear teeth defined therein, an upper portion 72 having a smooth cylindrical shape and a central disc 74. The central disc 74 is circular in shape and is located between the upper and lower portions 72 of the pinion 54 such that it extends outward from these portions of the pinion. Pinion 64 is in turn carried by a vertical shaft 76 such that the pinion is freely rotatable relative thereto. A pair of bearings 78 are used to rotatably mount the shaft 76 to frame plates 12 and 14.

Gear wheel 66, on the other hand, is pinned with shaft 76 at 80 and has a cylindrically shaped block 82 fixedly attached to its underside. Gear 66 is mounted on shaft 76 axially adjacent to pinion 54 such that the bottom surface of block 82 abuts against the top surface of the upper portion 72 of pinion 64. In this way, block 82 and the upper portion 72 of pinion 64 cooperate to maintain gear 66 and pinion 64 in spaced apart relationship from each other. The upper end of torsional spring 68 is suitably connected with gear 66 while the lower end of this spring is suitably connected to pinion 64. As a result, torsional spring 68 serves to couple and transfer motion from pinion 64 to gear 66.

Gear 66 in turn drives a pinion which is designated by the numeral 86. Pinion 86 is rigidly secured to a gear wheel 124 which is connected at 126 to a vertical shaft 128. Vertical shaft 128 is in turn rotatably mounted to frame plates 12 and 14 by means of a pair of bearings 130.

Gear 124 mates with and drives a pinion 132 which is rigidly secured to a bevel gear 134. Pinion 132 and bevel gear 134 are in turn connected at 136 to a vertical shaft 138. A pair of bearings 140 are used to rotatably mount shaft 138 to frame plates 12 and 14.

Bevel gear 134 drives a mating bevel gear 142 which is carried on a horizontal shaft 144. Shaft 144 in turn drives conventional alternator 146 through a magnetic clutch 148. Alternator 146 is provided with wires 150 which lead to a voltage regulator 152. In this way, the current produced by the alternator is delivered to voltage regulator 152 through wires 150. Voltage regulator 152 is electrically coupled with a large battery 154 through the regulators output wires 156. Conductor wires 156 are suitably coupled with battery 154 such that the output current of the alterator 146 may be used to recharge the battery.

It is contemplated that battery 154 may be employed to supply power to an electric motor (not shown) such as that commonly used in various types of kitchen appliances. It is to be understood, however, that the battery may also be used in other applications and for other purposes. Conductor wires 158 lead from the battery terminals 160 and are adapted for connection with the electric motor or any other device which the battery is to power.

Drive spring 18 is wound up by a conventional electric motor 162. Electric motor 162 drives output shaft 164 which carries a worm gear 166 in mesh with gear 28. Operating power is provided to electric motor 162 from battery 154 through wires 168 which extend from the battery to the motor.

A switch mechanism 170 is incorporated into an electric circuit comprising battery 154 and motor 162. Switch mechanism 170 is mounted to frame plate 12 and is controlled by a pair of actuator arms 172 and 174. Actuator arm 172 is comprised of a resilient piece of metal which extends outward from switch mechanism 170 in a cantilever fashion. The free end of actuator arm 172 is turned inward at 176 so that this portion of the arm is capable of riding against the outer peripheral edge 42 of actuator ring 40. Actuator arm 174 is also comprised of a resilient piece of metal which extends outward from switch mechanism 170 in a cantilever fashion. The free end of actuator arm 174 is turned outward at 178. Actuator arm 174 is positioned about actuator ring 40 such that this arm does not come in contact with the actuator ring at any time. Actuator arms 172 and 174 are respectively provided with electric contacts 180 and 182 which are arranged to be moved into and out of engagement with each other.

In operation, the gear train is driven by the unwinding action of drive spring 18. As drive spring 18 unwinds it imparts clockwise (as viewed in FIG. 1) rotational motion to shaft 22 through the drive collar 20. Since gear 36 is pinned to shaft 22, this gear moves in combination with the shaft. Gear 36 moves independently of the actuator ring 40 until locking pin 50 comes in contact with the trailing wall of slot 52. Thereafter, gear 36 and actuator ring 40 move in unison. This clockwise movement of gear 36 is in turn used to drive gear 56 in a counterclockwise direction. When viewed in FIG. 1, gear 36 mates with pinion 54 thereby imparting rotary movement to this pinion. Since pinion 54 is fixed to gear 56, the rotary motion imparted to pinion 54 is likewise transferred to gear 56.

Gear wheel 56 is allowed to rotate intermittently under the control of level 96. This intermittent movement of gear wheel 56 serves to inhibit continuous movement of the entire gear train which is used to drive alternator 146.

When pin 106b is engaged against one of the teeth 88a, wheel 88 is held against rotation as shown in FIG. 1. The force of spring 118, however causes wheel 112 to rotate in a clockwise direction so that pin 110 is allowed to enter notch 88. Continued movement of pin 110 causes the notched end of lever 96 to move about the axis provided by shaft 100 in a clockwise direction. This clockwise movement of the notched end of lever 96 disengages pin 106b from tooth 88a thereby allowing wheel 88 to rotate in a clockwise direction as viewed in FIG. 1. Soon thereafter, pin 104b carried by the other leg 104a is moved against one of the teeth 88a to again halt rotation of wheel 88. At this time, spring 118 is displaced in an opposite direction; consequently, it turns wheel 112 clockwise such that pin 110 enters notch 108 and acts to pivot lever 96 back in a counter clockwise direction. Pin 104b is then disengaged from tooth 88a to permit wheel 88 to rotate another short increment before pin 106b is again engaged with a tooth of the wheel.

In this fashion, lever 96 is reciprocated back and forth about its pivot axis to control the rotation of wheel 88. Both wheel 88 and lever 96 are controlled such that their motion is periodical. It is noted that teeth 88a are beveled to apply impulses to legs 104a and 106a each time they release from the teeth. This action helps to maintain lever 96 in constant motion in cooperation with spring 118.

Pinion 84 rotates in combination with wheel 88 since both of these components pinioned to a common shaft 92. This intermittent movement of pinion 84 restricts continuous movement of gear 56 because of the direct connection between the pinion and the gear. In this way, the rotary movement of gear 56 is controlled by means of lever 96.

Gear 56 also mates with the gear teeth defined in the lower portion 70 of pinion 64 to thereby intermittently impart clockwise rotational movement to the pinion. This intermittent movement of pinion 64 causes torsional spring 68 to be accordingly tightened. Once torsional spring 68 reaches a particular tension, gear 66 begins to move in combination with pinion 64. Torsional spring 68 is further operable to drive gear 66 for a limited period of time after pinion 64 is no longer being driven by gear 56. In this way, torsional spring 68 acts as a shock absorber and is operable to level out the movement of gear 66 thereby making the movement of this gear more uniform.

Gear 66 in turn mates with and drives pinion 86 which is secured to gear 124. As a result of this physical connection between pinion 86 and gear 124, pinion 86 and gear 124 are arranged to move in combination with each other whenever rotary motion is imparted to pinion 86 by gear 66.

Gear 124 acts through pinion 132 to drive bevel gear 134. Bevel gear 134 in turn cooperates with bevel gear 142 to intermittently drive alternator 146. As mentioned above, the intermittent movement of wheel 88 also controls the movement of gear 66, pinion 86 and gear 124 in such a manner as to intermittently drive bevel gear 134. The resultant driving of alternator 146 produces electric current which is applied as charging current to battery 154. In this way, the battery charging device of the present invention is operable to charge battery 154.

As gear 36 moves in response to the unwinding action of torsional spring 18, it pulls actuator ring 40 along with it. The in turned end 176 of contact arm 172 rides along the outer peripheral edge 42 of the actuator ring to control rewinding of torsional spring 18. When the in turned end 176 of contact arm 172 is riding along the peripheral edge of the actuator ring 40, contact arm 172 is held away from contact arm 174 thereby maintaining switch mechanism 170 in an "open" condition. Continual movement of actuator ring 40 causes notch 48 to be moved in position to receive the in turned end 176 of actuator arm 172 as shown in FIG. 1. When notch 48 is so positioned, the in turned end 176 of actuator arm 172 enters the notched area thereby allowing actuator arm 172 to be moved toward actuator arm 174 a sufficient distance to bring electrical contacts 180 and 182 in contact with each other. Contact between electrical contacts 180 and 182 places switch mechanism 170 in a "closed" condition causing motor 162 to be activated. Movement of the actuator ring 40 is coordinated with the operation of spring 18 so that notch 48 is positioned to receive the in turned end 176 of actuator arm 172 coincident with the spring reaching and unwound condition.

Activation of motor 162 causes worm gear 166 to rotate in such a manner as to move gear 28 in a clockwise direction thereby effectuating winding of torsional spring 18. As gear 28 moves in response to activation of motor 162, camming arm 34 engages actuator arm 174 and pushes both actuator arms 172 and 174 away from actuator ring 40. As camming arm 34 is moving actuator arms 172 and 174 away from actuator ring 40, movement imparting arm 32 is brought in contact with movement receiving arm 46. Thereafter, further clockwise movement of gear 28 causes the actuator ring 40 to be moved a distance sufficient to move notch 48 out of position to receive the in turned end 176 of actuator arm 172. Once camming arm 34 moves past actuator arm 174, actuator arm 174 is allowed to move away from actuator arm 172 to thereby return switch mechanism 170 to an "open" condition. The motor is then de-energized and rewinding of torsional spring 18 is discontinued.

From the foregoing, it will be seen that this invention is one well adapted to attain all the ends and objects herein above set forth together with other advantages which are obvious and which are inherent to the structure.

It will be understood that certain features and subcombinations are of utility and may be employed without reference to other features and subcombinations. This is contemplated by and within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a battery charging device of the type having a frame, a coil spring mounted on said frame for coiling and uncoiling movement, a drive gear mounted for rotation on said frame and coupled with said coil spring in a manner to rotate in response to uncoiling of the spring, a mechanical linkage coupled with and driven by said drive gear upon rotation thereof, and battery charging means driven by said linkage and operable to apply charging current to the battery, a shaft supported for rotation on said frame and carrying said drive gear thereon, a spring winding gear mounted on said shaft for rotation relative thereto and coupled with said spring in a manner to effect winding thereof in response to rotation of the spring winding gear, power means for effecting rotation of said winding gear, the improvement comprising:

an actuator ring mounted on said shaft for movement independently thereof, said ring presenting a peripheral notch therein;

lost motion means coupling said drive gear and said actuator ring with one another in a manner providing lost motion therebetween;

a switch mechanism for energizing and deenergizing said power means, said switch mechanism including a switch arm having a free end engageable against the periphery of said actuator ring with said free end of the switch arm entering said notch upon movement of the actuator ring to a preselected rotative position corresponding to an unwound condition of said spring, said switch mechanism being operable to deenergize said power means when said free end is engaged against the periphery of said actuator ring and to energize said power means when said free end is disposed in said notch; and means for removing said free end of the switch arm from said notch in response to rotation of said spring winding gear sufficient to effect a wound condition of the spring.

2. The improvement set forth in claim 1, including means for effecting rotation of said actuator ring to a position wherein said notch is remote from the free end of said switch arm when said free end has been removed from the notch.

3. The improvement set forth in claim 1, wherein said removing means includes a cam carried on said spring winding gear at a location to engage said switch arm in a manner to remove said free end from the notch by camming action when said spring winding gear reaches a predetermined rotative position.

4. The improvement set forth in claim 3, including a first arm projecting from said spring winding gear and a second arm projecting from said actuator ring, said first arm contacting said second arm to effect rotation of said actuator ring substantially simultaneously with the engagement of said cam against said switch arm, thereby moving said notch out of registration with the free end of the switch arm.

5. The improvement set forth in claim 1, wherein said lost motion means includes:
   a pin element projecting from one of said drive gear and actuator ring; and
   an arcuate slot in the other of said drive gear and actuator ring, said slot having opposite end surfaces engaged by said pin element to effect rotation of said drive gear and actuator ring in unison, said gear and ring moving independently when said pin element is between said end surfaces of the slot.

6. The improvement set forth in claim 1, wherein:
said mechanical linkage comprises a gear train having a plurality of meshing gears driven by said drive gear;
said gear train includes means for effecting intermittent movement of said gears; and
said gear train includes a torsional spring interconnecting a selected pair of gears in a manner to effect rotation of the gears in said pair in unison when said torsional spring is in a tightened condition, whereby to act as a shock absorber.

* * * * *